United States Patent Office

2,807,555
Patented Sept. 24, 1957

2,807,555
CERAMIC COLOR COMPOSITIONS

Oliver A. Short, Metuchen, N. J., assignor to E. I. du Pont de Nemours and Company, Wilmington, Del., a corporation of Delaware No Drawing. Application March 2, 1956, Serial No. 568,971

8 Claims. (Cl. 106—272)

This invention relates to vitreous enamel color compositions and more particularly it relates to new and improved vehicles for the application of vitreous enamel colors to a heat-resistant surface to which they may be bonded by an enamel firing operation.

Vitreous enamel colors, composed of inorganic pigments and finely ground glass frits, are commonly mixed with a suitable vehicle and applied with a squeegee through a screen stencil to a surface resistant to a vitreous enamel firing operation, for example, a metal or ceramic (glass, china, porcelain, refractory, or the like) surface. Such colors are often applied with successive different colors to produce a multi-colored design.

Recently there have been developed thermo-fluid vehicles for the rapid application of successive different colors. Such vehicles are solid at room temperature and are liquid at a slightly elevated temperature (between 120° F. and 212° F.). Such vehicles have the advantage of solidifying rapidly on surfaces at room temperature and eliminate drying operations between color applications.

Thermo-fluid vehicles, in order to function properly for the application of vitreous enamel colors, must have certain essential properties. For example, such vehicles must melt within a suitable temperature range, they must not run while molten, they must level-off properly before solidifying, they must adhere well to a glass or metal surface, the finely divided solid particles must remain properly dispersed in the vehicle, the vehicle must not gel in its molten condition, the mass must remain stable and not be subject to change upon aging, the applied color must remain moisture-resistant and the vehicle must be removable by volatilization during firing without leaving objectionable carbon deposits.

Because of these essential requisites it has heretofore been found necessary to mix together a number of particular materials which when molten together complement each other to produce the desired results.

It is an object of the present invention to produce an exceedingly desirable thermo-fluid vehicle for application of vitreous enamel colors which is composed of a specific combination of materials.

It is another object of this invention to produce a thermo-fluid vehicle for application of vitreous enamel colors consisting essentially of waxes and waxy materials, which vehicle levels off properly yet does not run while molten, adheres well to glass or metal, solidifies without gelling, remains stable and moisture-resistant and is removed without leaving carbon deposits upon firing.

Other objects of the invention will appear hereinafter.

These objects may be accomplished by producing a thermo-fluid vehicle consisting essentially of a natural vegetable wax taken from the group consisting of esparto wax, montan wax, ouricuri wax, and carnauba wax, a reaction product of stearic acid and an aliphatic amine containing less than six carbon atoms, and a polyethylene glycol having an average molecular weight between 4000 and 20,000. Preferably these thermo-fluid vehicles should contain phosphorated tall oil as a dispersion control agent.

The above-named constitutents should be present in the following percentages by weight:

20% to 75% of the reaction product of stearic acid and amine,
15% to 40% of the wax,
10% to 40% of the polyethylene glycol, and
0 to 3% phosphorated tall oil.

Although minor amounts of other non-resinous materials may be present, they should be present in insufficient amount to materially change the operating characteristics of the above constituents. Therefore, the above-named constituents should constitute at least 90% by weight of the vehicle.

As pointed out above, excellent vehicles may be prepared without the use of phosphorated tall oil; however, best results have been obtained with at least a small proportion, i. e., less than 3%, of this material present.

The preferred wax to be used in the composition of this invention is esparto wax; however, ouricuri wax, carnauba wax or montan wax may be used to good effect.

The preferred polyethylene glycol for this invention is one having an average molecular weight of about 6000. Polyethylene glycol having a molecular weight less than 4000 or greater than 20,000 does not appear to give satisfactory results.

The reaction product of an aliphatic amine having less than six carbon atoms and stearic acid produces specifically desirable results. The amine may be an alkyl amine, for example, mono- or di-methyl, mono- or di-ethyl, mono-propyl, or mono-butyl amine.

The vehicle of this invention may be mixed with the vitreous enamel colors at or slightly above the melting point of the vehicle. Very good results have been obtained by first heating the vitreous enamel colors and then mixing the hot colors with the vehicle. The vehicle ingredients may, if desired, be added to and mixed with a heated enamel color whereby the compounding of the vehicle and the blending with the enamel color takes place simultaneously. The vitreous enamel colors are mixed with the vehicle of this invention in proportions of vehicle to enamel color of 1:2 to 1:6.

The vitreous enamel colors generally used for the preparation of vitreous enamel paints or squeegee pastes are composed of 5% to 20% by weight of finely ground inorganic pigments and 95% to 80% by weight of finely divided vitreous enamel frit. Usually metal borosilicates, for example, lead borosilicate glass frits are employed.

The following examples are given to illustrate several preferred vehicles and vitreous enamel color compositions of this invention. It is to be understood that the specific details given in the examples are not to be considered as limiting the scope of the invention.

*Example I*

The following materials are placed in a steel receptacle and melted at a temperature of about 200° F. to 300° F. while stirring:

54.2% mono-ethylamine stearate,
24.7% esparto wax,
19.7% "Carbowax 6000" (a polyethylene glycol having an average molecular weight of 6000), and
1.4% phosphorate tall oil After these constituents have been thoroughly mixed, they are poured into two to six times their weight of finely divided vitreous enamel color and thoroughly mixed by milling. After cooling to solidify, the resulting color composition is broken in irregular pieces of the desired size, e. g., one-eighth inch to one-half inch pieces.

The pieces of color composition may be placed on a heated screen stencil and squeegeed on a metal or ceramic surface to produce a smooth adherent design. The applied color may be fired to produce a clear, bright, glossy design on the fired surface.

The vehicles of the present invention have exceptionally desirable characteristics to meet the exacting demands of a satisfactory thermo-fluid vehicle for application of vitreous enamel colors and, upon firing, the vitreous enamel colors are bright and glossy without carbon deposits.

The process of Example I is repeated using the following four examples of thermo-fluid vehicles. The enamel color compositions of these examples are easily and quickly applied to glass or metal surfaces by commercial production methods, and the resulting fired designs are smooth, bright and glossy.

*Example II*

55% ethylamine stearate,
25% carnauba wax
19% "Carbowax 6000," and
1% phosphorated tall oil.

*Example III*

64% diethyl amine stearate,
15% "Carbowax 20M" (a polyethylene glycol having an average molecular weight of 20,000),
20% esparto wax, and
1% phosphorated tall oil.

*Example IV*

59% trimethyl amine stearate,
20% "Carbowax 6000,"
20% esparto wax, and
1% phosphorated tall oil.

*Example V*

54% ethyl amine stearate,
24% montan wax,
20.5% "Carbowax 6000," and
1.5% phosphorated tall oil.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. A thermo-fluid vehicle for the application of finely divided vitreous enamel to a heat-resistant surface preparatory to fusing said enamel consisting essentially of the following constituents;

20% to 75% of the reaction product of stearic acid and an aliphatic mono-amine of less than six carbon atoms,
   15% to 40% of a natural vegetable wax taken from the group consisting of esparto wax, ouricuri wax, carnauba wax, and monton wax, and
   10% to 40% of a polyethylene glycol having a molecular weight between 4000 and 20,000, said constituents comprising at least 90% of said vehicle.

2. A vitreous enamel color composition consisting essentially of a vitreous enamel color and a thermo-fluid vehicle in the proportion of color to vehicle of 2:1 to 6:1, said vehicle consisting essentially of the following constituents;

20% to 75% of the reaction product of stearic acid and an aliphatic mono-amine of less than six carbon atoms,
   15% to 40% of a natural vegetable wax taken from the group consisting of esparto wax, ouricuri wax, carnauba wax, and montan wax, and
   10% to 40% of a polyethylene glycol having a molecular weight between 4000 and 20,000 said constituents comprising at least 90% of said vehicle.

3. The vehicle as defined in claim 1 in which said wax is esparto wax.

4. The vehicle as defined in claim 1 in which said wax is montan wax.

5. The vehicle as defined in claim 1 in which the polyethylene glycol has an average molecular weight of about 6000.

6. The vehicle as defined in claim 1 in which the wax is esparto wax and the polyethylene glycol has an average molecular weight of about 6000.

7. A thermo-fluid vehicle for the application of finely divided vitreous enamel to a heat-resistant surface preparatory to fusing said enamel consisting essentially of the following constituents;

20% to 75% of the reaction product of stearic acid and an aliphatic mono-amine of less than six carbon atoms,
   15% to 40% of a natural vegetable wax taken from the group consisting of esparto wax, ouricuri wax, carnauba wax, and montan wax,
   10% to 40% of a polyethylene glycol having a molecular weight between 4000 and 20,000, and phosphorated tall oil in an amount up to 3%, said constituents comprising at least 90% of said vehicle.

8. A vitreous enamel color composition consisting essentially of a vitreous enamel color and a thermo-fluid vehicle in the proportion of color to vehicle of 2:1 to 6:1, said vehicle consisting essentially of the following constituents;

20% to 75% of the reaction product of stearic acid and an aliphatic mono-amine of less than six carbon atoms,
   15% to 40% of a natural vegetable wax taken from the group consisting of esparto wax, ouricuri wax, carnauba wax, and montan wax,
   10% to 40% of a polyethylene glycol having a molecular weight between 4000 and 20,000, and phosphorated tall oil in an amount up to 3%, said constituents comprising at least 90% of said vehicle.

References Cited in the file of this patent

UNITED STATES PATENTS

| | | |
|---|---|---|
| 2,234,934 | Steinle | Mar. 11, 1941 |
| 2,395,025 | Wassell | Feb. 19, 1946 |
| 2,462,018 | Wood | Feb. 15, 1949 |